United States Patent [19]

Stewart et al.

[11] Patent Number: 5,305,866
[45] Date of Patent: Apr. 26, 1994

[54] HYDRAULIC DRIVE FOR A FEED AUGER

[75] Inventors: Ronald S. Stewart, Rock Rapids; Ronald F. Bechler, George, both of Iowa

[73] Assignee: Sudenga Industries, Inc., George, Iowa

[21] Appl. No.: 986,120

[22] Filed: Dec. 4, 1992

[51] Int. Cl.⁵ .............................................. B65G 47/18
[52] U.S. Cl. ..................................... 198/311; 198/314; 198/668
[58] Field of Search ............... 198/311, 314, 589, 668; 414/526

[56] References Cited

U.S. PATENT DOCUMENTS

| | | | |
|---|---|---|---|
| 2,800,238 | 7/1957 | Oliver | 214/522 |
| 2,839,208 | 6/1958 | Hansen | 214/522 |
| 2,883,076 | 4/1959 | Palmer | 214/83.32 |
| 3,251,456 | 5/1966 | Branine | 198/217 |
| 4,117,920 | 10/1978 | Oury | 198/311 |
| 4,530,429 | 7/1985 | Erickson | 198/313 |
| 4,603,775 | 8/1986 | Plett | 198/589 |
| 4,714,149 | 12/1987 | Tiede | 198/312 |
| 4,739,668 | 4/1988 | Head | 198/316.1 |
| 4,963,066 | 10/1990 | Boppart | 414/376 |
| 5,094,334 | 3/1992 | Bobrowski | 198/314 |
| 5,184,715 | 2/1993 | Feterl | 198/311 |

Primary Examiner—Joseph E. Valenza
Attorney, Agent, or Firm—Kinney & Lange

[57] ABSTRACT

A feed auger for transporting particulate material to a main auger which has a drive shaft driven by a direct mechanical connection from a PTO of a tractor vehicle. The feed auger is attached to a hopper at one end and pivotally mounted to the main auger at the other end such that particulate material entering the hopper is transported through the feed auger and into and through the main auger. The feed auger is driven by a hydraulic system operated from the drive shaft of the main auger, the hydraulic system providing independent control of the operation of the feed auger.

14 Claims, 4 Drawing Sheets

HYDRAULIC DRIVE FOR A FEED AUGER

BACKGROUND OF THE INVENTION

This invention relates to an auger system for transporting particulate material, and more particularly, to a hydraulically driven feed auger for feeding particulate material to a main auger.

Portable auger systems including a main auger tube and a hopper are well-known in the art. The hopper is connected to the lower end of the main auger tube and serves to supply particulate material to the main auger tube. More recently, side hoppers have been developed which themselves include feed auger tubes to feed the main auger tube. A lower end of the feed tube is connected to a hopper while an upper end of the feed tube is connected to the lower end of the main tube such that particulate material, received by the hopper is transported up the feed tube and then into and up the main tube. The feed tube is pivotally mounted on the main tube so that it can swing around to various positions on either side of the main tube so that the hopper can be properly positioned to receive the material to be transported. Hence, such feed auger tubes and associated hoppers are called "side hoppers" in the trade.

Portable augers for agricultural use typically have a drive shaft for coupling to a power takeoff (PTO) of a tractor vehicle for driving the main auger flight in the main auger tube by direct mechanical connection. The feed auger flights have been driven by a variety of different arrangements. For example, feed auger flights have been driven mechanically with an array of drive lines and U-joint, a set of gears and U-joints, or a hydraulic motor powered by the hydraulic system of the tractor. Where the tractor's hydraulic system is employed, that system must have an adequate capacity to operate the hydraulic motor(s) of the auger(s)

U.S. Pat. No. 4,963,066 to Boppert describes separate driving of the main auger flight and the feed auger flight, the feed auger flight being driven by hydraulic motors powered by the hydraulic system of the tractor. This arrangement necessitates the use of the auger with a tractor having a hydraulic system of adequate size. If the tractor does not have an appropriate hydraulic system, the Boppert system is unusable.

U.S. Pat. No. 5,094,334 to Bobrowski describes a main auger flight powered by the PTO shaft of the tractor, with the feed auger flight mechanically driven by gears and U-joints coupled to the main auger shaft. Since there is a fixed drive between the main auger flight and feed auger flight, the user has no separate control over the two drives and thus no ability to permit stopping of the feed auger to clear the main auger.

Prior gear and mechanical systems required lubrication which added the risk of excess lubrication oil being leaked into the grain, thereby contaminating the grain and occasionally restricting grain flow, thereby diminishing the effectiveness of the auger. Further, such systems often ran hot, creating risk of grain fires. Hydraulic systems are better than gear and mechanical drive systems, but repeated connection of the hydraulic hoses from the tractor's hydraulic system tended to wear seals in the connections, leading to leaks of hydraulic fluid into the grain.

SUMMARY OF THE INVENTION

The present invention relates to a feed auger system for transporting particulate material to a main auger. The main auger has a feed end and a discharge end and an auger flight has a drive shaft arranged to be coupled to an external power source to transport particulate material from the feed end to the discharge end. The feed auger system comprises a feed auger tube with a feed end and a discharge end, a feed auger flight mounted within the feed auger tube for transporting particulate material within the feed auger tube from its feed end to its discharge end to deliver particulate material to the feed end by the main auger. Drive means is connected to the main auger drive shaft for driving the feed auger flight In a preferred embodiment, the drive means includes a hydraulic motor responsive to pressurized hydraulic fluid for driving the feed auger tube. A hydraulic pump connected to the main auger drive shaft pressurizes hydraulic fluid to drive the hydraulic motor. A hydraulic reservoir supplies hydraulic fluid to the hydraulic pump.

DETAILED DESCRIPTION OF THE PREFERRED EMBODIMENTS

Figure 1:
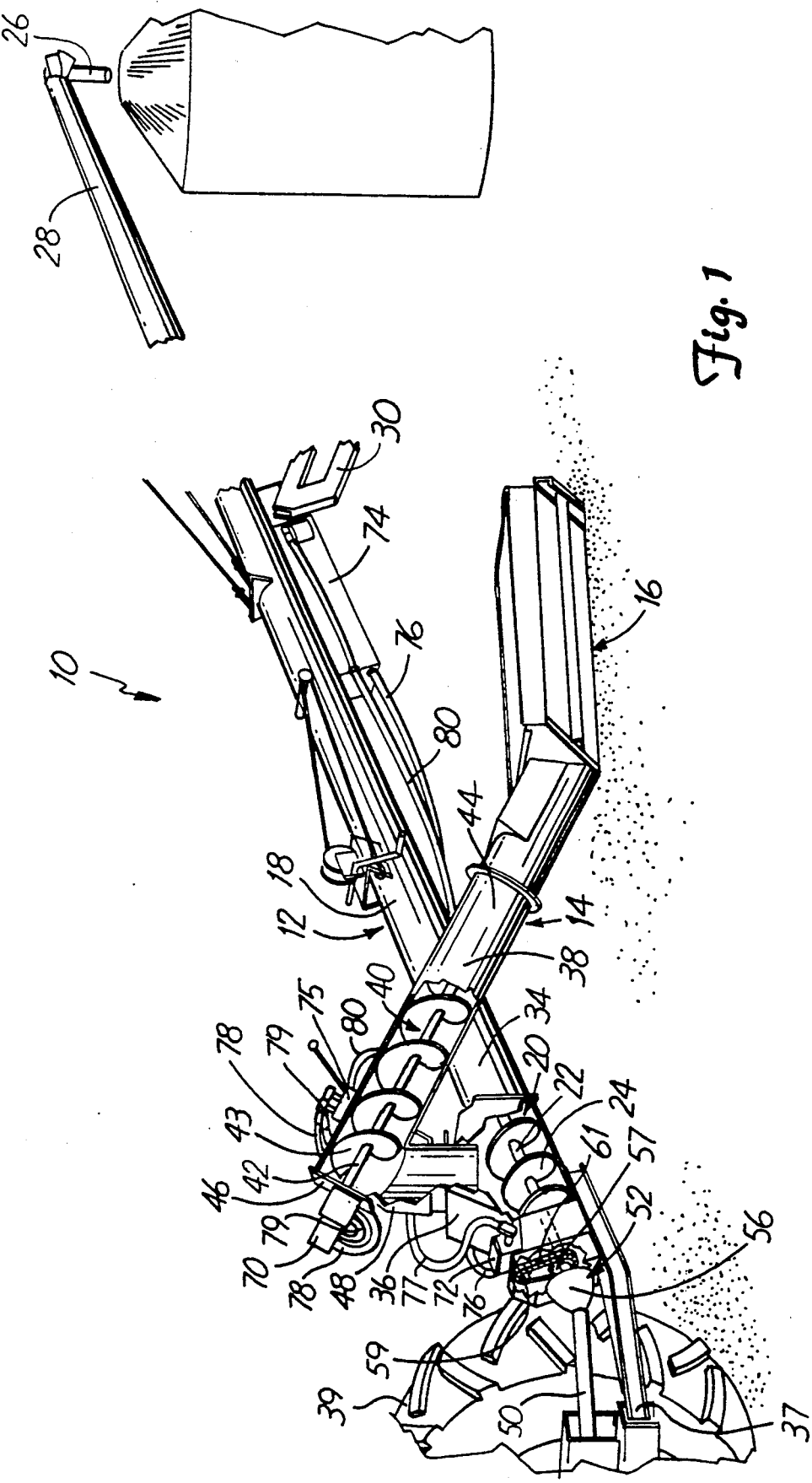
FIG. 1 is a perspective view of an auger system employing a feed auger in accordance with the present invention, portions of a main auger tube and feed auger tube being broken away.
Figure 2:
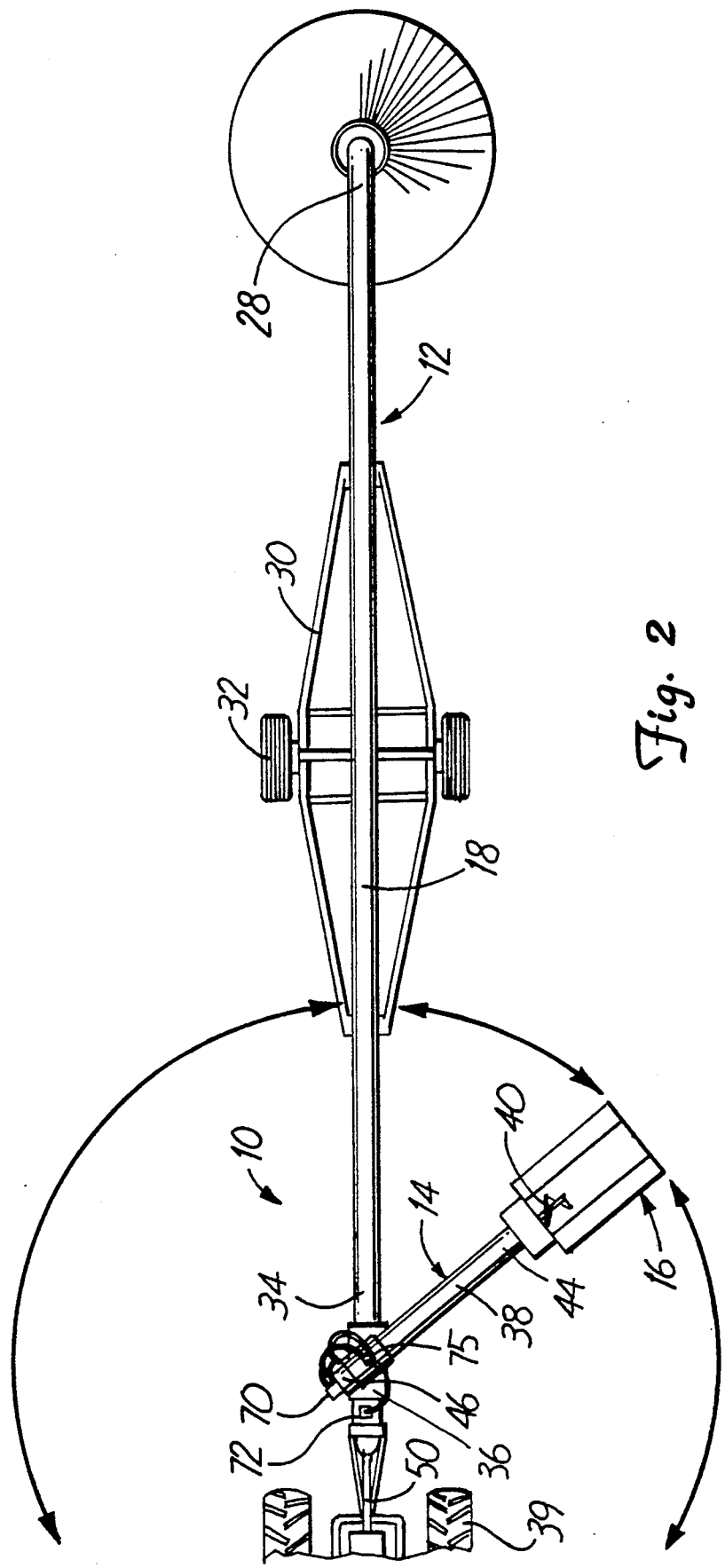
FIG. 2 is a top plan view of the auger employing a feed auger a shown in FIG. 1.

The auger system, generally indicated at 10 in FIGS. 1 and 2, includes a main auger 12, a feed auger 14, and a hopper 16. The system is typically used for transporting grain, but can be used for transporting any particulate material The main auger 12 includes a main auger tube 18 and a main auger flight 20 rotatably mounted therein. The main auger flight 20 is of conventional construction and includes a shaft 22 and a helical screw thread 24 surrounding the shaft 22 which operates in a well-known manner to transport the particulate material along the length of the main auger tube 18 by rotation of the shaft 22 about its axis. A discharge spout 26 is provided at an upper end 28 of the main auger 12. A frame structure 30 which includes ground wheels 32 (FIG. 2), supports the main auger 12 and provides for transportation of the auger arrangement across a ground surface. A winch (not shown) operates to adjust the height of frame structure 30 to raise and lower the discharge spout 26 relative to the ground surface. The particular details of the winch and adjustment mechanism are not shown as they are well-known to those skilled in the art and vary according to design plans and user needs. A lower end 34 of the main auger tube 18 includes an inlet boot 36. Hitch 37 connects the auger to a hitch on tractor 39.

The feed auger 14 includes a feed auger tube 38 and a feed auger flight 40 rotatably mounted therein. The feed auger flight 40 is of conventional construction and includes a shaft 42 and a helical screw thread 43 surrounding the shaft 42 which operates in a well-known manner to transport particulate material along the length of the feed auger tube 38 by rotation of the shaft 42 about its axis. A lower end 44 of the feed auger tube is connected to the hopper 16 and a portion of the feed auger flight 40 is exposed within the hopper 16 for collecting particulate material dumped into the hopper 16 for feeding into the feed auger 14. An upper end 46 of the feed auger tube 38 is connected to a downwardly directed discharge spout 48 in the form of a tubular member. The discharge spout 48 is arranged to fit in an opening in boot 36 to discharge particulate material into the inlet boot 36, the opening having a diameter somewhat larger than the diameter of the tubular discharge spout 48. Discharge spout 48 is connected to the feed auger tube 38 at a downwardly directed angle so that in a normal working position where the hopper 16 resting upon the ground, the discharge spout 48 has its axis approximately vertical.

The auger arrangement 10 described above can be powered by any external power source having the appropriate horsepower, but the auger arrangement is typically used with a tractor vehicle 39. A power take-off shaft (PTO) on the tractor vehicle is coupled to shaft 50 on the auger arrangement 10 for driving the main auger. The shaft 50 drives a first mechanical assembly 52 for driving the main auger flight 20 and a second mechanical assembly 55 for driving a self-contained hydraulic assembly 54 for driving the feed auger flight 40. The speed of rotation of the PTO controls the speed of both the main auger flight 20 and the feed auger flight 40.

Figure 3:
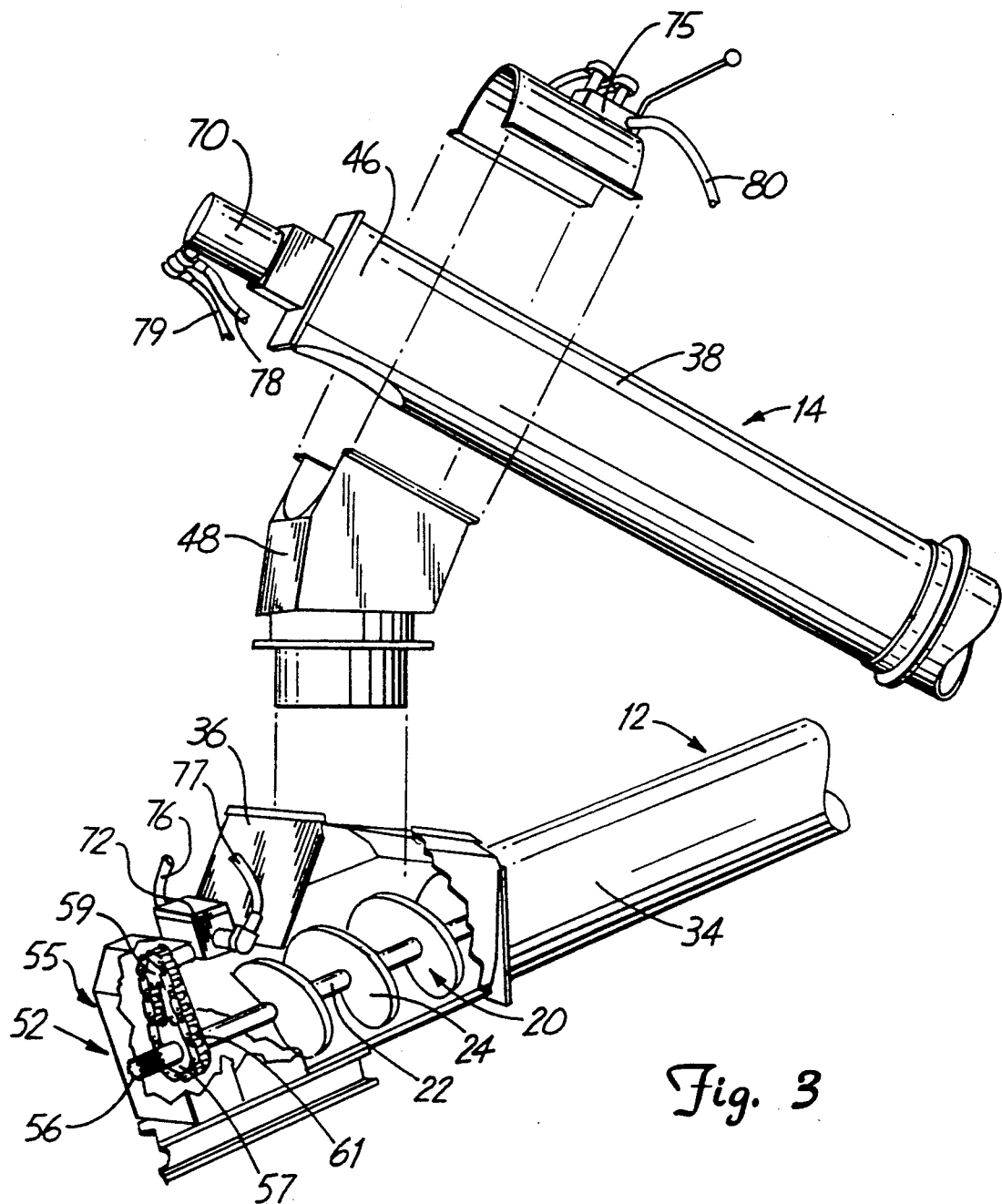
FIG. 3 is an exploded view of the drive assembly as shown in FIG. 1.

As shown particularly in FIG. 3, the first mechanical assembly 52 includes a coupling 56 for connecting shaft 50 to the main auger flight 20.

The second mechanical assembly 55 includes a first sprocket 57 coupled to the drive shaft 56, a second sprocket 59 coupled to a hydraulic assembly and a chain links connector 61 connecting the first and second sprockets to each other.

The hydraulic assembly includes hydraulic motor 70, hydraulic pump 72, hydraulic reservoir 74 (FIG. 1), control valve 75 and hydraulic lines 76–80.

The hydraulic motor 70 is mounted at the upper end 46 of the feed auger tube 38 and is operatively connected to the feed auger shaft 42 (FIG. 1) to thereby cause shaft 42 to rotate. The hydraulic pump 72 is mounted at the lower end 34 of the main auger tube 18 and is connected to the hydraulic motor 70 via the control valve 75 to supply pressurized hydraulic fluid for driving the hydraulic motor 70. Pump 72 is mechanically connected to sprocket 59 to pressurize hydraulic fluid from reservoir 74 when driven by sprocket 59. The hydraulic reservoir 74 is shown attached to the underside of the main auger tube 18 between the upper end 28 and lower end 34. It should be apparent to one skilled in the art that the positioning of the hydraulic pump 72 and the hydraulic reservoir 74 can vary to suit particular needs. Also, the ratio between the first sprocket 57 and second sprocket 59, the size of the hydraulic pump 72, hydraulic motor 70, and reservoir are determined so that the feed auger flight 40 runs at a preestablished drive ratio to the main auger flight 20.

Figure 4:
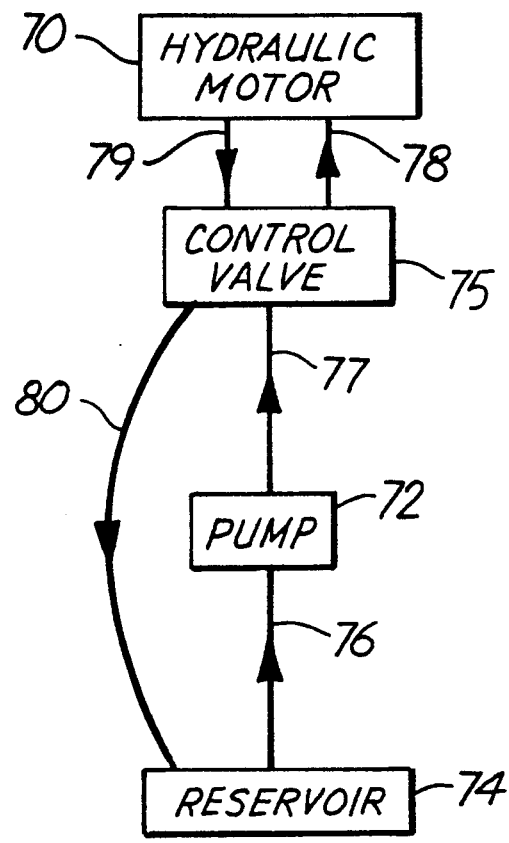
FIG. 4 is a schematic diagram of the hydraulic system of the auger system in accordance with the present invention.

FIG. 4 illustrates the hydraulic connections between the hydraulic motor 70, hydraulic pump 72 and hydraulic reservoir 74, as well as the control valve 75. Hydraulic fluid flows from the hydraulic reservoir 74 to the hydraulic pump through hydraulic line 76. Pressurized hydraulic fluid flows from the hydraulic pump 72 to the control valve 75 via hydraulic line 77. Hydraulic fluid flows from the control valve 75 into the hydraulic motor 70 via hydraulic line 78 and back to the control valve 75 via hydraulic line 79. Finally, hydraulic fluid flows from the control valve 75 back to the hydraulic reservoir 74 via control line 80.

The control valve 75 is of conventional design to control the hydraulic flow between the hydraulic pump 72 and the hydraulic motor 70 to thereby shut-off and turn on the hydraulic motor to start and stop the feed auger flight 40.

In operation, the auger arrangement 10 can be used with any tractor having the appropriate horsepower to drive the main auger flight 20 and the hydraulic pump 72, not necessarily one with a hydraulic system. The auger arrangement 10 is attached to the tractor via the hitch 37 and transported to a desired location at which point the hopper 16 is both lowered to the ground surface and positioned about the main auger 12 so as to receive the particulate materials.

The tractor PTO drive shaft 50 rotates the drive shaft 56. The drive shaft 56 rotates the main auger flight 20 within the main auger tube 18 and operates the second mechanical assembly 55 to drive the hydraulic pump 72. The hydraulic pump pumps hydraulic fluid from the hydraulic reservoir 74 along line 76 into the control valve 75 along line 77, when the control valve 75 is open into the hydraulic motor 70 along line 78, back to the control valve 75 along line 79, and finally back to the hydraulic reservoir 75 along line 80. The pressurized hydraulic fluid thereby drives the hydraulic motor 70 which in turn rotates the feed auger flight 40 within the feed auger tube 38.

With the main auger flight 20 and the feed auger flight 40 both being rotated, particulate material loaded into the hopper 16 falls into the exposed portion of the feed auger flight 40 within the hopper. Particulate material is transported along the helical screw thread 42 within the feed auger tube 38 until it reaches the discharge spout 48 at the upper end 46 of the feed auger tuber 38. The particulate material falls through the discharge spout 48 and into the inlet boot 36 where it collects around the main auger flight in the lower end 34 of the helical screw thread 24 until it reaches the discharge spout 26 at the upper end 28 of the main auger tube. The particulate material flows through the discharge spout 26 and into the desired storage bin or other locations.

Thus, the present invention permits an operator to use an auger arrangement 10 with any tractor of the correct horsepower, regardless of whether that tractor has its own hydraulic system because the present invention employs a self-contained hydraulic system for driving the feed auger and an optional hydraulic winch.

The self-contained hydraulic system also permits independent control of the feed auger to permit operation of the main auger without the feed auger to clear materials out of the main auger, and avoids the use of mechanical systems which run hot and leak oil into the grain.

Although the present invention has been described with reference to preferred embodiments, workers skilled in the art will recognize that changes may be made in form and detail without departing from the spirit and scope of the invention.

What is claimed is:

1. In an auger arrangement having a main auger, a feed auger operatively arranged with respect to the main auger such that particulate materials can be transported through the feed auger and the main auger, a support structure for supporting the main auger and the feed auger, and a mechanical drive means for driving the main auger from power derived from an external power source, the improvement comprising:

a hydraulic assembly mounted on the auger arrangement, the hydraulic assembly including a hydraulic motor responsive to pressurized hydraulic fluid for driving the feed auger, and a hydraulic pump for supplying pressurized hydraulic fluid to the hydraulic motor; and connecting means operatively connecting the hydraulic pump to the mechanical drive means to drive the feed auger.

2. The auger arrangement of claim 1, further comprising control means for controlling hydraulic fluid to the hydraulic motor such that operation of the feed auger can be varied relative to the main auger.

3. The auger arrangement of claim 1, wherein the connecting means includes a first sprocket coupled to the mechanical drive means and a second sprocket coupled to the hydraulic pump, the first sprocket operatively engaging the second sprocket.

4. An auger arrangement for transporting particulate material comprising:

a main auger having a main auger tube, a helical main auger flight rotatably mounted within said main auger tube, a discharge spout at an upper end of the main auger tube, and an inlet at a lower end of the main auger tube;

frame means for supporting the main auger tube with the upper end raised relative to the lower end;

drive coupling means for connection to an external power source;

first mechanical connection means communicating drive from the drive coupling means to the main auger flight;

a feed auger having a feed tube, a helical feed auger flight rotatably mounted within said feed auger tube, and a downwardly depending discharge spout at a discharge spout at a discharge end of the feed auger flight operable with the inlet of the main auger tube; and hydraulic drive means mounted on the auger arrangement, the hydraulic drive means including a hydraulic motor responsive to pressurized hydraulic fluid for driving the feed auger flight, a hydraulic pump for supplying pressurized hydraulic fluid to the hydraulic motor, and a hydraulic reservoir for storing and supplying hydraulic fluid to the hydraulic pump, and second mechanical connection means operatively connecting the hydraulic pump to the drive coupling means for driving the feed auger flight.

5. The auger arrangement as in claim 4, wherein the hydraulic pump is mounted to the main auger.

6. The auger arrangement as in claim 4, wherein said inlet of the main auger tube is enclosed by a boot having an opening therein for receiving and pivotally coupling said discharge spout of the feed auger.

7. The auger arrangement as in claim 4, wherein the drive coupling means is arranged to connect to a power takeoff.

8. The auger arrangement as in claim 4, wherein the second mechanical connection means includes a first sprocket coupled to the main auger flight and a second sprocket coupled to the hydraulic pump, the first sprocket operatively engaging the second sprocket.

9. The auger arrangement as in claim 4, further comprising mounting means for mounting the feed auger on the main auger such that the discharge spout of the feed auger is arranged to discharge particulate material into the inlet of said main auger such that particulate matter can be transported from a hopper to the feed auger flight to the main auger flight to the discharge spout of the main auger, the mounting means being arranged to allow the feed auger to be pivoted relative to the main auger.

10. The auger arrangement as in claim 4, further including control means for controlling hydraulic fluid to the hydraulic motor such that operation of the feed auger can be varied relative to the main auger.

11. The auger arrangement of claim 1, wherein the hydraulic assembly further includes a hydraulic reservoir for supplying hydraulic fluid to the hydraulic pump.

12. The auger arrangement of claim 1, wherein said hydraulic pump is mounted on the main auger.

13. The auger arrangement of claim 11, wherein the hydraulic reservoir is mounted on the support structure.

14. The auger arrangement as in claim 4, wherein the hydraulic assembly further includes a hydraulic reservoir mounted on the support structure for supplying hydraulic fluid to the hydraulic pump.

* * * * *